Aug. 3, 1965    R. W. HAVENS    3,198,616
APPARATUS FOR CONVEYING MOLTEN GLASS CHARGES
Filed Dec. 9, 1960
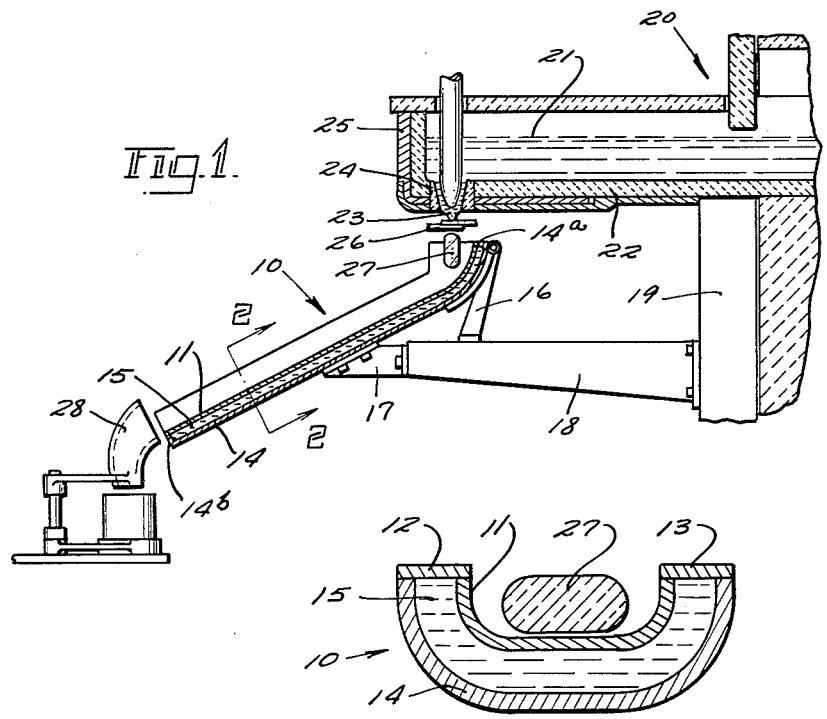
Fig.1.
Fig.2.
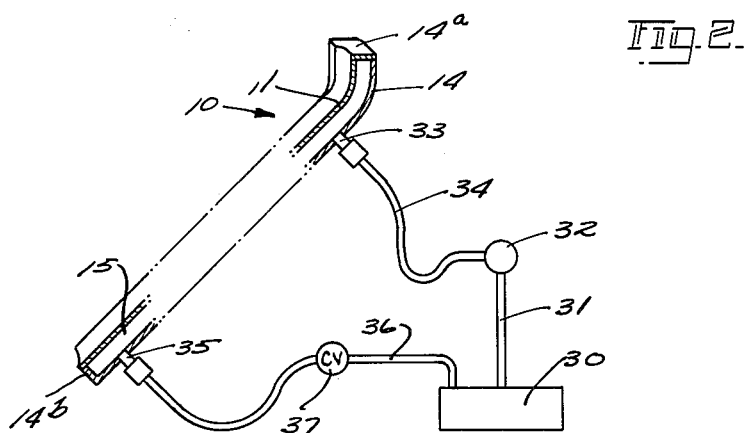
Fig.3.
INVENTOR.
ROBERT W. HAVENS
BY J. R. Nelson
and W. A. Scharth
ATTORNEYS United States Patent Office 3,198,616
Patented Aug. 3, 1965

3,198,616
APPARATUS FOR CONVEYING MOLTEN
GLASS CHARGES
Robert W. Havens, Toledo, Ohio, assignor to Owens-
Illinois Glass Company, a corporation of Ohio
Filed Dec. 9, 1960, Ser. No. 74,971
5 Claims. (Cl. 65—169)

This invention is related to the art of feeding molten glass gobs from a forehearth feeder to a glassware forming machine, and more particularly to method and apparatus for conveying such a gob of molten glass under improved handling and temperature conditions.

In the art developed heretofore, molten glass is conditioned and fed from a furnace forehearth to a feeder chamber having an underside orifice or outlet. The glass flows as a stream from this outlet and is propelled therethrough by an implement to form a suspended stream or column of glass below the orifice. Periodically a severing means, such as reciprocating shears, cut through this suspended stream of glass to thereby form a mass of molten glass referred to as the "gob." This gob is deposited on some inclined surface or is received by a chute or guide to carry and guide the gob under movement by gravitational forces to a desired location at a forming machine position.

It is, therefore, an object of the present invention to provide an improved method of transfer and guide or conveyance means wherein the gob is received and transferred from the feeder to the machine on a self-generated layer or cushion of steam or other vapor.

It is a further object of the invention to provide an improved gob conveyance structure, such as a chute, which has a gob conveying surface formed of a porous metal that receives a liquid from the underside of that surface supplied by a pressurized system to uniformly wet the gob conveying surface and thereby enable, through the latent heat of the glass gob deposited on that surface, instantaneous generation of a layer of vapor on which the gob is transported by gravity to the forming position on the machine.

Other objects and advantages will become apparent to persons skilled in the art from a reference and understanding of the hereinafter presented drawings taken in conjunction with the detailed description thereof.

On the drawings:

FIG. 1 is a side elevational view, presented partly in section, showing the invention adapted to its surroundings in conveying glass from a furnace forehearth to a blank mold of a forming machine;

FIG. 2 is a cross-sectional view of the novel gob chute of the present invention, taken along lines 2—2 of FIG. 1; and FIG. 3 is a diagrammatic view of the gob chute and fluid supply system for maintaining a constant pressurized supply of a liquid at the underside of the porous gob guiding surface.

Broadly considered, the invention contemplates a gob guide chute for receiving and conveying gobs of glass to a forming machine by transferring the gob under gravitational forces on a cushion or layer of a vapor such as may be generated by flash conversion of a liquid phase to a vapor phase. With further reference to the drawings, the fabrication of the gob chute and its porous metal gob guiding surface will now be described.

The gob chute on FIG. 1 is referred to generally at 10 and is comprised of a U-shaped gob guiding channel 11 formed of a porous metal that is fabricated by a sintering process. The porous metal is composed of nodules which, as one example of material that is readily available on the commercial market, are copper granules coated with a layer of tin. This material is known in the metallurgy trade as a bronze metal filter powder having a copper to tin ratio of approximately 90% to 10%. The powdered metal particles are made to have a center or core of copper and an exterior layer of tin. The nodules are substantially spherical in shape and their sizes may vary widely, however, the mesh size of the nodules ultimately determine the porosity in the metal article that is fabricated therefrom. For the purpose of the present invention, it has been found that satisfactory sizes useable to obtain the porosity best suited for conveying gobs of glass is a powdered metal in a range of nodule sizes between 60 mesh and 150 mesh. To be more specific, this includes nodules that will pass through a screen having larger than a 150 mesh size. These screens would therefore have from 60 to 150 openings per lineal inch. In the metallurgy industry, these screen sizes of nodules are frequently referred to as —60 mesh to —150 mesh size metal powder.

In forming the glass guiding surface of channel 11, a mold defining the general contour of that element is filled with the selected powdered metal nodules, as already indicated, and compacted in the mold cavity until it is uniformly filled. This gob guiding channel 11 may be molded in one or more sections that are later assembled or connected to form the desired contour and length of the chute 10. The filled mold or molds for forming channel 11 are placed in a reducing furnace atmosphere of an endothermic gas at about one pound positive pressure and a temperature maintained in the furnace in the range between 1050° F. and 1825° F. The reducing atmosphere in this heat chamber is essential for preventing oxidation of the powdered metal constituents and for obtaining a homogeneous fusion to yield more uniform porosity in the final casting. The sintering time in the furnace may be varied to yield various results in shrinkage and porosity of the formed article. As an example, it is preferred to use a sintering time of between 20 and 30 minutes at a temperature of about 1560° F.

After the sintering is completed, the mold is removed and the cast channel is placed in a cooling atmosphere for lowering the temperature to ambient temperature.

As may be seen on FIGS. 1 and 2, the guiding channel 11 is then fabricated together with marginal spacers 12 and 13 and a contoured backing member 14 to form a lengthwise fluid chamber 15 at the underside of channel 11.

Additionally, end plates 14a and 14b are provided at the opposite ends of the chute 10 to completely enclose the chamber 15. The chamber 15 has a corresponding lengthwise configuration along the length of gob guide channel 11.

The chute 10 is secured to a suitable support such as at arm 16 and bracket 17 mounted on a framework 18 that is attached to the vertical girder 19 of the framework for the furnace 20. Suitable height adjustments and other structural alignment features for the chute 10 may be provided, but since they do not play a specific part in the present invention, such support or mounting gear for the chute 10, as may be needed in actual operation, may be selected from existing devices by those skilled in the art. In its mounted position, as described, chute 10 has the chamber 15 thereof connected into a system as shown on FIG. 3 for supplying a liquid to the chamber. In this system, a sump or tank 30 is provided to contain the liquid to be utilized, exemplary forms of this liquid will be discussed hereinafter. The tank 30 has a conduit connection 31 with a pump 32 which is in turn connected to an inlet port 33 to chamber 15 by a line conduit 34. Spaced along the length of chute 10 from the inlet port 33 is an exhaust port 35 which connects with the chamber 15. Port 35 may serve as an exhaust or, as is shown on FIG. 3, may have a return connection to the tank 30 by a line conduit 36. If, as suggested by the first alternative, the exhaust port 35 opens to atmosphere or a drain, it should be provided with a throttle valve or restriction valve of some form to regulate a desired pressure within the chamber 15. In the other alternative, as is illustrated on FIG. 3, the return line 36 is provided with a check valve or throttling device 37 for the purpose of controlling the pressure by the rate of exhaust of liquid from chamber 15. A third alternative system that is adequate would be one in which no outlet port, such as 35, is provided or the outlet port 35 closed entirely. However, under this latter system, it is more difficult to regulate and maintain the desired pressure of the fluid being supplied within chamber 15.

The supply system originating with tank 30 may be provided with water or a water soluble oil, to name but two of several satisfactory liquids which may be employed in the invention. The liquid is pumped from tank 30 by the pump 32 into the inlet 33 for chamber 15 to fill the chamber 15. As the chamber 15 is filled, liquid will exhaust therefrom through port 35 past the check valve 37. This latter valve will be set such that a positive pressure of the liquid will be maintained in the chamber 15. Thus, in operation the interstices or pores of the porous metal gob guiding channel 11 will be filled with liquid supplied at its back surface and beads of the mentioned water or soluble oil will come through onto the front surface of the channel 11.

Molten glass is maintained at a level 21 within the forehearth channel 22 and issued as a suspended stream 23 through the discharge orifice 24 of the feeder 25. This stream 23 is cut periodically by reciprocating shear elements 26 to form a gob of glass 27. This gob will then fall to be deposited onto the upper glass guiding surface of the channel 11 that is being maintained in a continuously wetted condition with beads of the liquid that are forced through the interstitial structure. The heat of the glass will vaporize these beads to form a vapor layer. This will support the gob as it travels relatively free of friction down the incline of the channel 11 and into the mold scoop 28. The vapor will also envelop the gob and thereby serve to insulate it from surrounding chilling effects normally encountered. The mold scoop 28 may be manipulated in time with the parison mold 29 to load the latter with the gob 27, whereupon the loaded gob is subsequently formed to the shape of a glass article. The mold scoop may be constructed similarly to the construction of the chute 10.

As an alternative, suggested herein, the chamber 15 of the gob chute 10 may be supplied with air. In this instance, the air will pass through the voids or pores of the surface 11 to form a delivery cushion and cooling medium for the gob on its travel to the mold 29.

In the operation of the invention, the supplying of the liquid through the porous metal channel 11 provides both a temperature insulator and a lubricant for the glass gob in its travel between the feeder and the mold. The heat conductivity of the vapor formed from the liquid, for example, either stream or oil vapor, has a lower heat transmission coefficient than air. Therefore, more accurate and exact controls may be obtained under the use of the invention by introduction of a liquid through the pores of the chute gob guiding surface than by the use of pressurized air; and, furthermore, the porosity of the channel 11 need not be so precise in the use of liquid as compared to the use of air.

If, as indicated previously, water is used in the system, one further feature of the invention provides that the metal members 12, 13, 14, 14a and 14b which cooperate with the porous metal channel 11 to define the chamber 15, be bronze or copper clad or plated. Also, the parts of the system for handling and supplying the liquid will be constructed of a similar type metal. This additional structural provision is for the purpose of having the parts of the system that come into contact with the water of the same polarity as the porous metal itself, which in the above described example is bronze, so as to eliminate the possible electrolytic effect that the apparatus of the system may have on the water. If a dissimilarity exists in electrical polarity of the metals used between channel 11 and the other metal parts forming the chamber 15 and the water supply system, the electrolysis effect will eventually cause some minerals in the water to form carbonate solids that will eventually corrode and close the pores of the channel 11. Thus, the choice of metals used in the construction for eliminating dissimilar polarity of metals will enable longer operating life and trouble free operation of the invention.

As may be readily appreciated from the foregoing description of the invention, it provides an improved method of handling glass in delivering it from a feeder to a forming unit in that lubricants, dopes, coatings, laminate chute constructions etc. are no longer needed. Furthermore, the gob, because it is carried on a layer of vapor phase of a liquid, is not so readily subjected to deformation, and the temperature treatment of the gob during its transfer is more uniform and consistent. Therefore, a better product may be obtained from its use.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. Apparatus for receiving and delivering a gob of molten glass comprising a chute structure defining a glass gob guiding surface constructed of a porous metal having a preselected porosity and mounted such that its said gob guiding surface is at an incline, a chamber enclosing the back surface of said structure opposite said guiding surface and along the length of the latter, the pores of said chute structure communicating between said guide surface and said chamber, a source of vaporizable liquid under pressure, an inlet connection to said chamber, a conduit connection between said inlet and said pressure source, an outlet to said chamber spaced from said inlet, and a regulable throttle valve means connected with said outlet for maintaining the vaporizable fluid under a predetermined pressure in said chamber sufficient to force liquid to bleed uniformly through the pores of said chute structure and maintain its glass gob guiding surface uniformly wet with vaporizable liquid, whereby the heat of a molten glass gob deposited on said wetted surface locally vaporizes said vaporizable liquid and provides a vapor layer thereof on which the gob is conveyed along the chute structure.

2. The apparatus defined in claim 1, wherein the source of vaporizable liquid under pressure comprises a tank containing a supply of the vaporizable liquid, and a pump connected to the vaporizable liquid in said tank and to said conduit connection to said inlet of the chamber for pumping vaporizable liquid from the tank to maintain a predetermined positive pressure supply of vaporizable liquid in the chamber.

3. Apparatus for receiving and delivering a gob of molten glass which comprises a chute structure fabricated of sintered powdered metal nodules defining an inclined, porous, glass guiding surface having a preselected porosity, a backing water chamber structure enclosing the back side of said porous metal chute structure, an inlet to said chamber, means connected to said inlet for supplying water to said chamber and maintaining the latter filled with water under a pressure sufficient to feed water through the pores of said porous metal chute structure and maintain its glass guiding surface uniformly wet with the water; the interior surfaces of said chamber being constructed of a material having the same polarity as the polarity of the sintered powdered metal nodules of said porous chute structure so as to neutralize electrolysis effect on the water being supplied to the chamber.

4. The apparatus defined in claim 3, wherein the sintered powdered metal nodules comprise a bronze metal filter powder in a range of nodule sizes between 60 mesh and 150 mesh, and said interior surfaces of said backing water chamber are constructed of a material selected from the group consisting of bronze and copper.

5. The apparatus defined in claim 3, and having an outlet to said chamber spaced from the inlet, and means connected to the outlet regulating the flow of water therefrom to create a water pressure within the chamber sufficient to feed the water through the pores of said chute structure.

References Cited by the Examiner

UNITED STATES PATENTS

| | | | |
|---|---|---|---|
| 958,613 | 5/10 | Forgo | 65—25 |
| 1,638,593 | 8/27 | Mulholland | 65—25 |
| 2,387,886 | 10/25 | Devol | 65—25 |
| 2,844,918 | 7/58 | Van De Walle et al. | 65—182 |

DONALL H. SYLVESTER, *Primary Examiner.*

ALLEN B. CURTIS, *Examiner.*